F. H. GERDEMAN.
DRAFT APPLIANCE FOR TRACTORS.
APPLICATION FILED JAN. 12, 1920.
1,379,759.
Patented May 31, 1921.
2 SHEETS—SHEET 2.
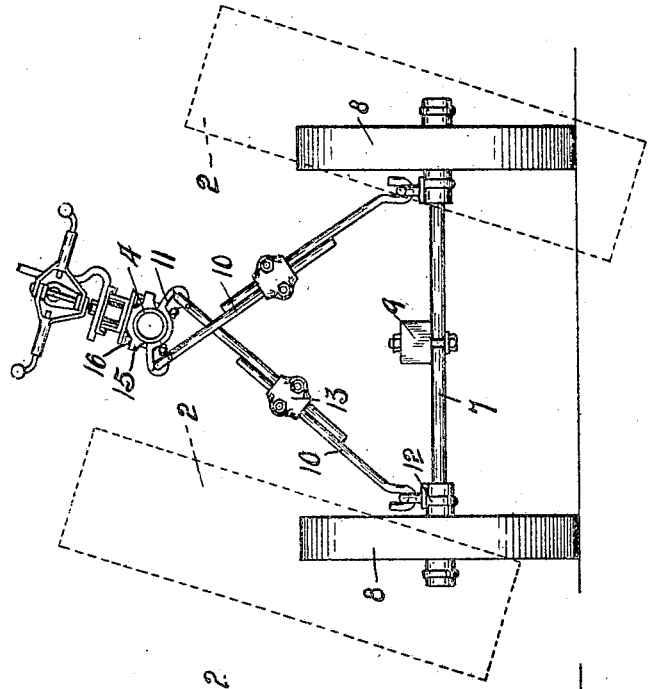
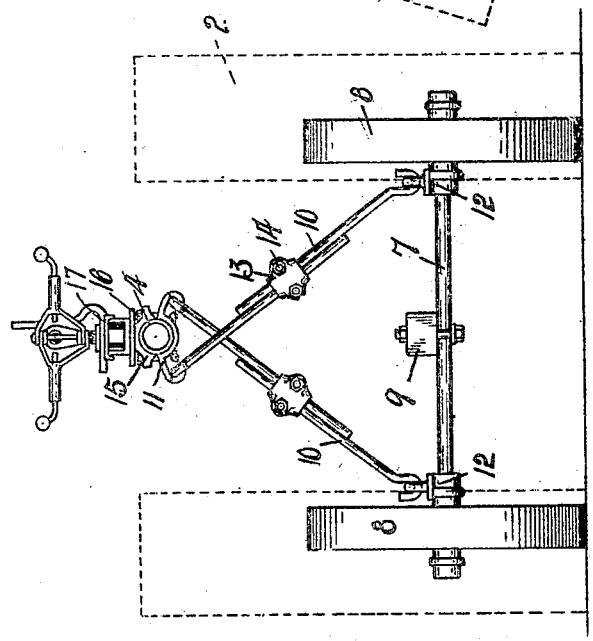
INVENTOR
Frank H Gerdeman,
By Gwin Gwin & Crampton,
His attys.

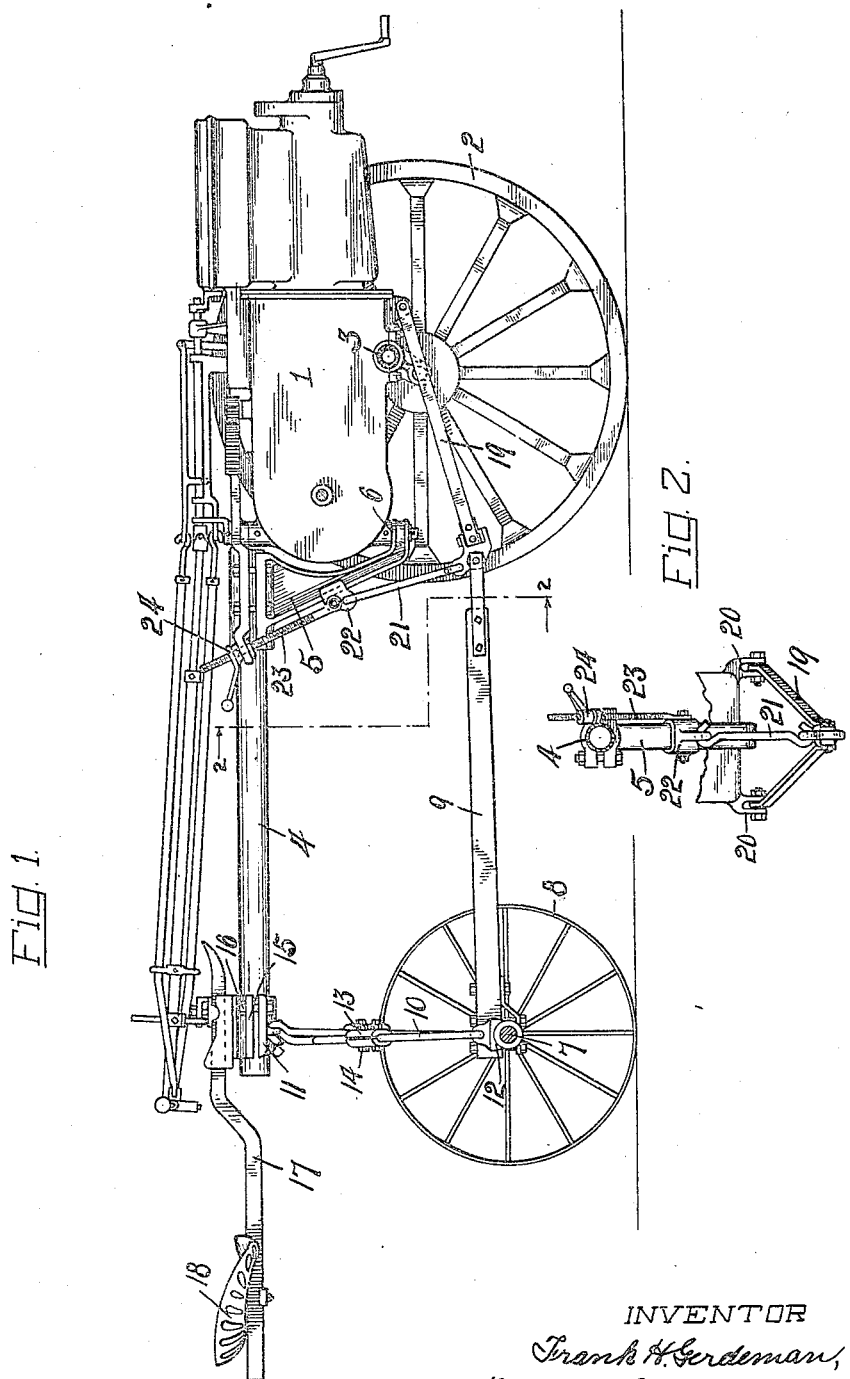

UNITED STATES PATENT OFFICE.

FRANK H. GERDEMAN, OF FINDLAY, OHIO.

DRAFT APPLIANCE FOR TRACTORS.

1,379,759.  Specification of Letters Patent.  Patented May 31, 1921.

Application filed January 12, 1920. Serial No. 350,839.

*To all whom it may concern:*

Be it known that I, FRANK H. GERDEMAN, a citizen of the United States, and a resident of Findlay, in the county of Hancock and State of Ohio, have invented a certain new and useful Draft Appliance for Tractors; and I do hereby declare the following to be a full, clear, and exact description of the invention, such as will enable others skilled in the art to which it appertains to make and use the same, reference being had to the accompanying drawings, and to the characters of reference marked thereon, which forms a part of this specification.

This invention relates to draft appliances particularly intended for use in connection with tractors, and has for its object the provision of an improved simple and efficient appliance of this character which is capable of being easily and quickly hitched or attached to practically all agricultural implements, trucks and other devices, in a manner to permit free lateral or wrenching movements of the tractor relative to the appliance to which attached, and vice versa.

A further object of the invention is the provision of an improved draft appliance of this character which is capable of vertical adjustment in a simple and efficient manner to suit the height of the draft to the attached appliance and to the work to be performed.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a side elevation of an appliance embodying the invention attached to a tractor, and with parts broken away. Fig. 2 is a fragmentary section on the line 2—2 in Fig. 1. Fig. 3 is a rear end elevation thereof with the tractor and portions of the draft means removed, and Fig. 4 is a similar view thereof illustrating the position of the draft beam when the tractor is standing at a side inclination relative to the apparatus attached thereto.

Referring to the drawings, 1 designates the body frame of a tractor, and 2, 2 the supporting wheels therefor, which are carried at the ends of an axle 3.

The draft appliance embodying the present invention comprises in part a draft beam 4, which is preferably of tubular form and projects rearwardly from the upper portion of the tractor frame 1, and is pivoted thereto for relative horizontal swinging movements. The forward end of the beam 4 is provided with a yoke 5, with an arm thereof projecting forward from the end of the beam over the rear edge portion of the tractor frame and with its other arm projecting downward and thence under the rear portion of the tractor frame, the arms being axially pivoted thereto, as at 6.

The apparatus to be drawn by the tractor and which coöperates with the draft appliance to maintain the tractor frame in proper position, is illustrated, in the present instance, by a truck, which comprises the axle 7, wheels 8 at the ends thereof, and tongue 9 projecting forwardly from the axle centrally thereof.

The rear end of the draft beam 4 is supported in proper position above the truck or other apparatus to which it is attached by a pair of rods 10 which have universal pivotal connection at their lower ends to the axle 7 at respective sides of the tongue 9 and adjacent to the wheels 8, and have their upper ends crossing each other and universally pivoted to the respective ends of a cross-arm 11, which is fixedly mounted on the rear end portion of the beam 4 for turning movements therewith. The lower ends of the supporting rods 10 are detachably hooked within eyes or loops provided on the top portions of collars or clips 12 mounted on the axle 7 and the upper ends of the rods are hooked preferably in a detachable manner through eyes provided in the end portions of the cross-arm 11, thus adapting the rods for both longitudinal and transverse swinging or pivotal movements relative to the beam. Each rod 10 preferably comprises two sections, which lap each other at their inner ends and are clamped together in desired longitudinal adjustment by clamps 13 through which the rods may have relative longitudinal adjusting movements when the clamps are loosened. These clamps, in the present instance, comprise two opposed members which are drawn together in clamping engagement with the rods by bolts 14. It is thus possible to adjust the length of the rods 10 to suit the distance at which it is desired to support the beam 4 above the axle 7 or other part of the attached truck, implement, or the like.

The cross-arm 11 adjustably engages the under side of the beam 4 and is fixedly held thereto by the coöperative action of an opposed clamping member 15 and connecting bolts 16. The clamping member 15, in the present instance, has the beam 17 of the driver seat 18 attached thereto and also carries some of the control parts of the tractor.

It is evident, that with this manner of supporting the beam 4, the tractor and the truck, or other apparatus to which attached, may have free relative lateral twisting or wrenching movements without imparting a distorting action from one to the other, as the supporting rods 10 and their manner of connection between the axle 7 and beam 4 are adapted to have the necessary relative movements to accommodate themselves to the relative twisting or wrenching action of the tractor and apparatus drawn thereby. This is illustrated in Figs. 3 and 4 of the drawings. For instance, should one wheel of the tractor be traveling through a low place like a dead furrow in a field, the tractor would exert a twisting or wrenching action on the draft appliance relative to the attached truck and would ordinarily have a tendency to change its course of movement thereby necessitating an operation of the steering apparatus to maintain the tractor in the desired course of travel. With my improvement the tendency of the tractor to change its course upon a twisting action is eliminated.

The tongue 9 is attached at its forward end for vertical pivotal movements to the rear end of a draft yoke 19, which has its arms projecting forwardly in diverging relation and pivotally connected to respective lugs 20 at the sides of the forward end portion of the frame 1, as best shown in Fig. 2. A suspending rod or member 21 connects the rear end of the yoke 19 to a slide block 22 that is guided for vertical sliding movements by the downwardly projecting arm of the draft beam yoke 5. The block 22 is carried by a rod 23, which projects up through a portion of the yoke 5 and has an adjusting nut 24 threaded thereon above the frame part through which projected. It is thus evident that a turning of the nut 24 on the rod 23 will effect a vertical adjustment of both the block 22 and the rear end of the yoke 19 suspended therefrom to suit the desired line of draft to be applied to the tongue 9 and attached truck, implement or the like. This is an important feature as it enables the line of draft to be varied as desired to suit the work desired to be performed or to adapt it for the apparatus to be acted on. The permissible vertical adjustment of the draft yoke 19 is important as in cultivating corn or other high plants it becomes necessary to have a high clearance and this can be accomplished by simply turning the nut 24 until the rear end of the draft yoke has the desired clearance.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. The combination with a tractor, of a draft element projecting rearwardly therefrom, an apparatus trailing from the tractor, and a pair of supporting members rising from the apparatus in transversely spaced relation crossing each other and connected in transversely spaced relation at their upper ends to the draft element for movements relative thereto.

2. In combination, a tractor, a draft element projecting rearwardly therefrom, an apparatus trailing from the tractor below the element, and a pair of longitudinally adjustable supporting members rising from the apparatus in spaced relation transversely of the element and thence crossing each other and connected at their upper ends to the element in transversely spaced relation thereto.

3. In combination, a tractor, a draft element projecting rearwardly therefrom, an apparatus trailing from the tractor below the element, a pair of supporting members rising from the apparatus in spaced relation transversely of the element, thence crossing each other, and connected for universal pivotal movements to the element in spaced relation transversely thereof.

4. In combination, a tractor, a draft element extending rearwardly therefrom, an apparatus trailing from the tractor below the element, a member carried by the draft element for rotating therewith, and crossed supporting members rising from the apparatus and pivotally connected at their upper ends to said first member in spaced relation transversely of the element.

In testimony whereof I have hereunto signed my name to this specification.

FRANK H. GERDEMAN.